(12) United States Patent
Bogaert

(10) Patent No.: US 8,579,085 B2
(45) Date of Patent: *Nov. 12, 2013

(54) SUSPENDED ACCESS CHAIR WITH RESCUE SYSTEM

(75) Inventor: Joost Bogaert, Lier (BE)

(73) Assignee: Sky Climber LLC, Delaware, OH (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/981,156

(22) Filed: Dec. 29, 2010

(65) Prior Publication Data

US 2012/0168252 A1 Jul. 5, 2012

(51) Int. Cl.
*E04G 3/30* (2006.01)

(52) U.S. Cl.
USPC ........... 182/133; 182/128; 182/136; 182/142; 182/150; 182/187

(58) Field of Classification Search
USPC .................. 182/128, 133, 136, 142, 150, 187
See application file for complete search history.

(56) References Cited

U.S. PATENT DOCUMENTS

| | | | | | |
|---|---|---|---|---|---|
| 742,447 | A | * | 10/1903 | Kidder | 182/133 |
| 2,654,638 | A | * | 10/1953 | Elliott | 182/133 |
| 3,504,767 | A | * | 4/1970 | Sherman | 182/136 |
| 3,520,383 | A | * | 7/1970 | Loock | 182/133 |
| 3,630,315 | A | * | 12/1971 | Meyer | 182/142 |
| 3,727,723 | A | * | 4/1973 | Pitcairn et al. | 182/133 |
| 3,873,146 | A | | 3/1975 | Houshar | |
| 3,907,066 | A | * | 9/1975 | Newton | 182/112 |
| 3,957,135 | A | * | 5/1976 | Lane | 182/136 |
| 4,008,785 | A | * | 2/1977 | Mugnaini | 182/133 |
| 4,222,140 | A | * | 9/1980 | Olewinski et al. | 14/71.3 |
| 4,225,012 | A | * | 9/1980 | Hindle | 182/112 |
| 4,296,836 | A | | 10/1981 | Cooper | |
| 4,341,285 | A | | 7/1982 | Krickovich | |
| 4,347,913 | A | * | 9/1982 | Cromer, Jr. | 182/142 |
| 4,386,680 | A | * | 6/1983 | Reed | 182/142 |
| 4,406,351 | A | * | 9/1983 | Littlejohn et al. | 182/47 |
| 4,493,395 | A | * | 1/1985 | Rittenhouse | 182/187 |
| 4,538,704 | A | | 9/1985 | Forrest | |
| 4,593,789 | A | * | 6/1986 | Treants | 182/142 |

(Continued)

FOREIGN PATENT DOCUMENTS

CA 2341398 A1 3/2000
DE 4339638 A1 5/1995

(Continued)

*Primary Examiner* — Alvin Chin Shue
*Assistant Examiner* — Colleen M Chavchavadze
(74) *Attorney, Agent, or Firm* — David J. Dawsey; Michael J. Gallagher; Gallagher & Dawsey Co., LPA

(57) ABSTRACT

A suspended access chair with a rescue system that may be utilized to access a wind turbine blade while mounted on a tower for purposes such as inspection, maintenance, cleaning, and repair of the blade is provided. The suspended access chair generally includes a chair frame assembly. Upper frame and lower frame assembly rollers are secured to the chair frame assembly and are configured for rolling contact along an edge of the blade. The suspended access chair further includes primary dextral and primary sinistral gripping arms. The gripping arms may be adjusted to conform to the shape of the blade and include rollers configured for rolling contact along a portion of the blade. A hoist is provided to raise and lower the chair along a suspension rope. The rescue system is used to lower the suspended access chair from an elevated position to the ground during emergency situations.

19 Claims, 13 Drawing Sheets

(56) References Cited

U.S. PATENT DOCUMENTS

| | | | |
|---|---|---|---|
| 4,602,698 A * | 7/1986 | Grant | 182/142 |
| 4,738,335 A * | 4/1988 | Ishii | 182/129 |
| 4,811,803 A * | 3/1989 | Green | 180/7.5 |
| 5,009,284 A * | 4/1991 | Authement, Sr. | 182/142 |
| 5,131,491 A | 7/1992 | Varner et al. | |
| 5,343,979 A * | 9/1994 | Goto | 182/147 |
| 5,351,783 A | 10/1994 | Celli | |
| 5,685,393 A * | 11/1997 | Early | 182/133 |
| 6,505,709 B1 * | 1/2003 | Masse | 182/145 |
| 7,740,107 B2 | 6/2010 | Lemburg et al. | |
| D632,221 S | 2/2011 | Bogaert | |
| 7,934,698 B2 * | 5/2011 | Ball et al. | 254/371 |
| 2007/0056801 A1 | 3/2007 | Iversen | |
| 2009/0020361 A1 | 1/2009 | Teichert | |
| 2012/0168252 A1 * | 7/2012 | Bogaert | 182/142 |
| 2012/0325581 A1 * | 12/2012 | Gunther et al. | 182/129 |

FOREIGN PATENT DOCUMENTS

| | | |
|---|---|---|
| WO | 03048569 A2 | 6/2003 |
| WO | 2007085265 A1 | 8/2007 |
| WO | 2008104272 A2 | 2/2008 |

* cited by examiner

SUSPENDED ACCESS CHAIR WITH RESCUE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present disclosure relates to the field of suspended access systems, and more particularly, to a suspended access chair with a rescue system that may be utilized to access a wind turbine blade while mounted on a tower for purposes such as inspection, maintenance, cleaning, and repair of the wind turbine blade.

BACKGROUND OF THE INVENTION

In order to operate efficiently as possible, wind turbines, and wind turbine blades in particular, are routinely inspected, cleaned, repaired, and generally maintained. Such routine inspections, cleaning, repair, and maintenance generally require at least one worker to gain access to the wind turbine blade, which is generally situated at a considerable height above ground level.

Typically, large and complex work platforms are utilized to lift the worker and their equipment to gain access to the wind turbine blade. For many of these work platforms an anchoring or suspension device is required that must be fixed to the wind turbine tower at a high elevation. In order to fix these anchoring or suspension devices to the tower, heavy lifting machinery, such as a crane, must be utilized to lift and position these devices. Moreover, the work platform itself will likely weigh a considerable amount and require expensive machinery to lift and lower the work platform to provide access to and from the wind turbine blade. Still further, a large and complex work platform requires a large amount of time and expense to assemble and prepare before it can be successfully utilized.

What is needed in the art is an access solution that provides the benefits of large and complex work platforms, but does not require a large amount of time or any extra expensive machinery to prepare it for use. The presently disclosed suspended access chair with a rescue system addresses these needs, as well as others.

SUMMARY OF THE INVENTION

In its most general configuration, the suspended access chair with a rescue system advances the state of the art with a variety of new capabilities and overcomes many of the shortcomings of prior devices in new and novel ways. The suspended access chair with a rescue system overcomes the shortcomings and limitations of the prior art in any of a number of generally effective configurations. The suspended access chair with a rescue system demonstrates such capabilities and overcomes many of the shortcomings of prior devices and methods in new and novel ways.

The present disclosure relates to a suspended access chair with a rescue system that may be utilized to access a wind turbine blade while mounted on a tower for purposes such as inspection, maintenance, cleaning, and repair of the wind turbine blade. The suspended access chair generally includes a chair frame assembly that forms the basic supporting structure of the suspended access chair. An operator seat is secured to the chair frame assembly to provide comfortable support to the operator when utilizing the suspended access chair.

The suspended access chair further includes an upper frame assembly roller and a lower frame assembly roller. The upper and lower frame assembly rollers are secured to the chair frame assembly and are configured for rolling contact along an edge of the wind turbine blade.

In order to help stabilize and guide the suspended access chair as it travels up and down the wind turbine blade, the suspended access chair has a primary dextral gripping arm and a primary sinistral gripping arm. The primary dextral gripping arm includes at least one dextral gripping arm roller configured for rolling contact along a portion of the wind turbine blade. Similarly, the primary sinistral gripping arm includes at least one sinistral gripping arm roller configured for rolling contact along a portion of the wind turbine blade. Both the primary dextral and primary sinistral gripping arms are pivotally connected to the chair frame assembly. The pivoting connections allow the primary dextral and primary sinistral gripping arms to be adjusted so that the primary dextral and primary sinistral gripping arms are capable of conforming to the varying profile of the wind turbine blade.

In order to adjust the position of the primary dextral and primary sinistral gripping arms to conform to the varying profile of the wind turbine blade, the suspended access chair includes a primary dextral gripping arm adjustor and a primary sinistral gripping arm adjustor. The primary dextral gripping arm adjustor is secured to the chair frame assembly and the primary dextral gripping arm, while the primary sinistral gripping arm adjustor is secured to the chair frame assembly and the primary sinistral gripping arm. In one particular embodiment, the primary dextral and primary sinistral gripping arm adjustors comprise a manually operated jack screw.

The suspended access chair further includes a hoist mounted on the chair frame assembly. The hoist raises and lowers the suspended access chair along a suspension rope to allow the chair operator to gain access to the wind turbine blade.

The rescue system is part of the suspension rigging for the suspended access chair and is configured for lowering the suspended access chair from an elevated position to the ground. The rescue system is especially useful for lowering the suspended access chair in emergency situations.

In one embodiment, the rescue system includes a rescue support frame having a friction brake and a release device capable of moving from a locked position to a released position. The rescue support frame is portable and suitable for use with any wind turbine system where the suspended access chair is utilized. During use, the rescue support frame is releasably secured to the tower.

The rescue system further includes at least one rigging support ring. The at least one rigging support ring serves as the master link for the suspension rigging of the suspended access chair. The suspension rope, along which the suspended access chair climbs, and a secondary rope are each secured to the at least one rigging support ring.

The next components of the rescue system are a first rigging line and a second rigging line. The first rigging line has a first rigging line proximal end and a first rigging line distal end. Similarly, the second rigging line has a second rigging line proximal end and a second rigging line distal end. The first rigging line proximal end is secured to the at least one rigging support ring, and the first rigging line distal end is secured to the release device when the release device is in the locked position. The second rigging line proximal end is secured to the at least one rigging support ring, while the second rigging line distal end is secured to the tower.

The rescue system further includes a rescue rope having a rescue rope proximal end and a rescue rope distal end. In one embodiment, the rescue rope proximal end is secured to the at least one rigging support ring and a portion of the rescue rope between the rescue rope proximal and distal ends is wound around the friction brake of the rescue support frame.

When the rescue system is used to lower the suspended access chair from an elevated position to the ground, a couple of steps must be performed. First, the second rigging line is caused to disengage the tower. Next, the release device is caused to move to the released position to release the first rigging line distal end. At this point, the rescue rope will be supporting the suspended access chair and may be utilized to lower the suspended access chair from the elevated position to the ground.

BRIEF DESCRIPTION OF THE DRAWINGS

Without limiting the scope of the suspended access chair with a rescue system as claimed below and referring now to the drawings and figures:

Figure 1:
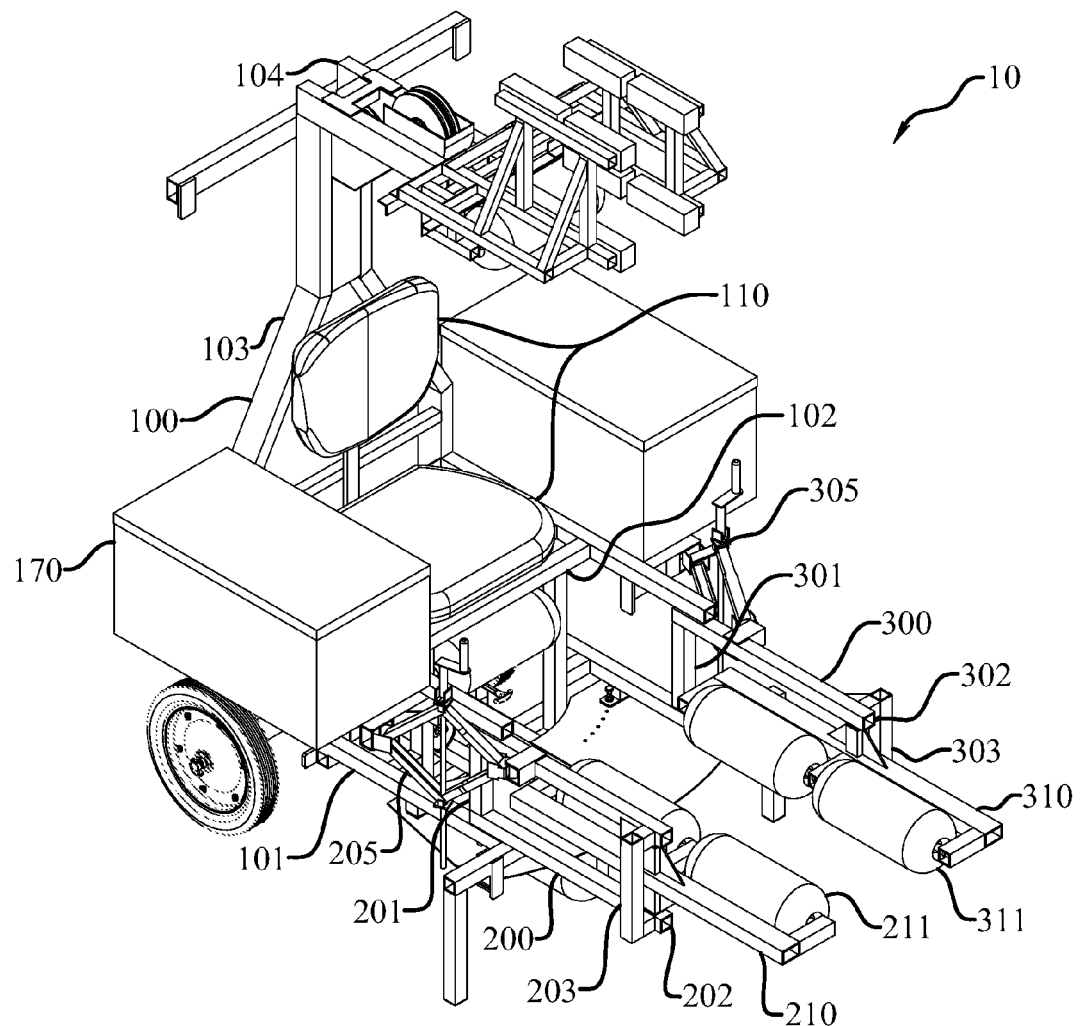
FIG. 1 is a front perspective view of an embodiment of the suspended access chair, not to scale.

These drawings are provided to assist in the understanding of the exemplary embodiments of the suspended access chair with a rescue system as described in more detail below and should not be construed as unduly limiting the device. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The presently disclosed suspended access chair (10) with a rescue system (700) enables a significant advance in the state of the art. The preferred embodiments of the suspended access chair (10) and rescue system (700) accomplish this by new and novel arrangements of elements and methods that are configured in unique and novel ways and which demonstrate previously unavailable but preferred and desirable capabilities. The description set forth below in connection with the drawings is intended merely as a description of the embodiments of the claimed suspended access chair (10) and rescue system (700), and is not intended to represent the only form in which the suspended access chair (10) and rescue system (700) may be constructed or utilized. The description sets forth the designs, functions, means, and methods of implementing the suspended access chair (10) and rescue system (700) in connection with the illustrated embodiments. It is to be understood, however, that the same or equivalent functions and features may be accomplished by different embodiments that are also intended to be encompassed within the spirit and scope of the claimed suspended access chair (10) and rescue system (700).

Figure 7:
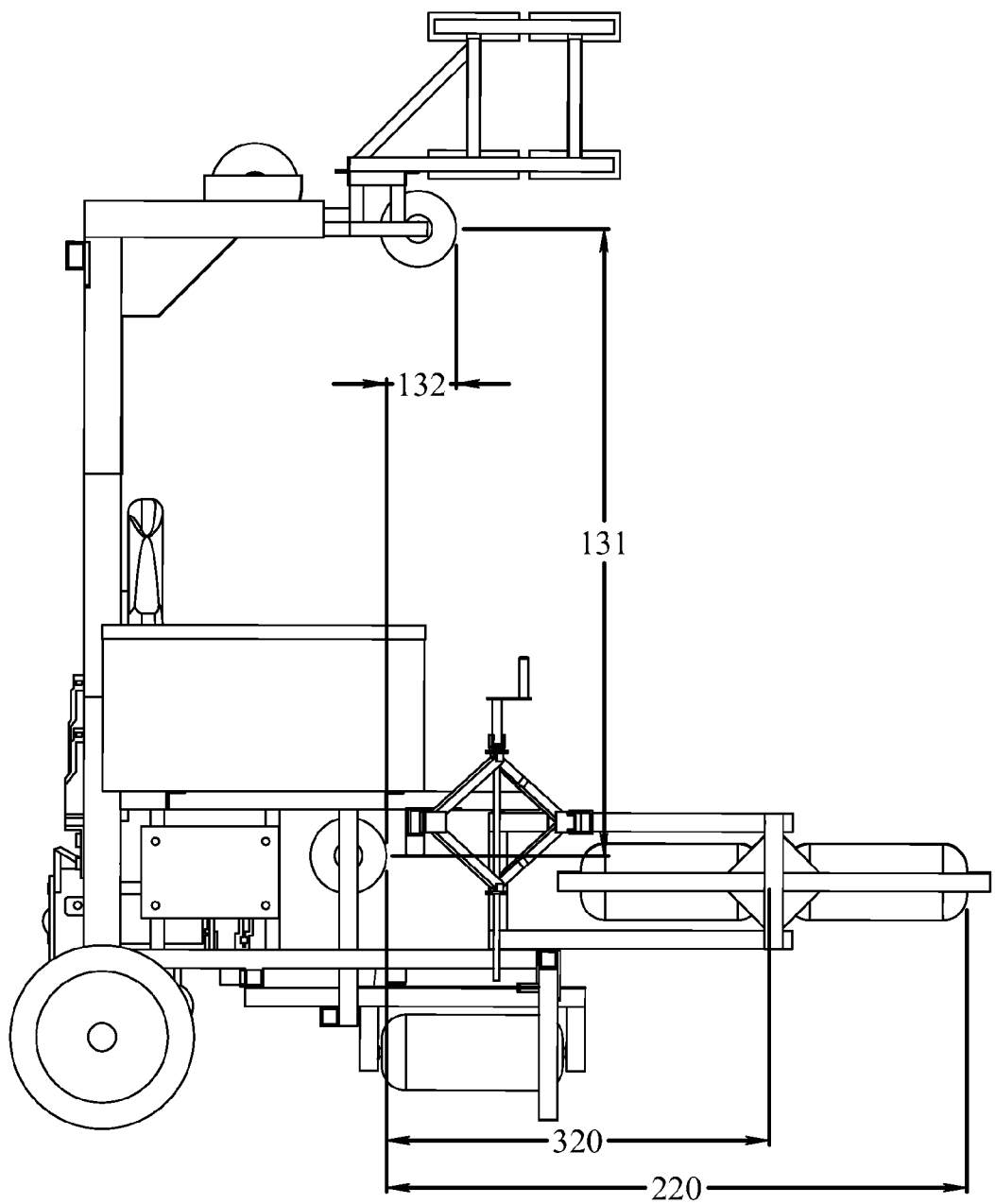
FIG. 7 is a right side elevation view of an embodiment of the suspended access chair, not to scale.
Figure 8:
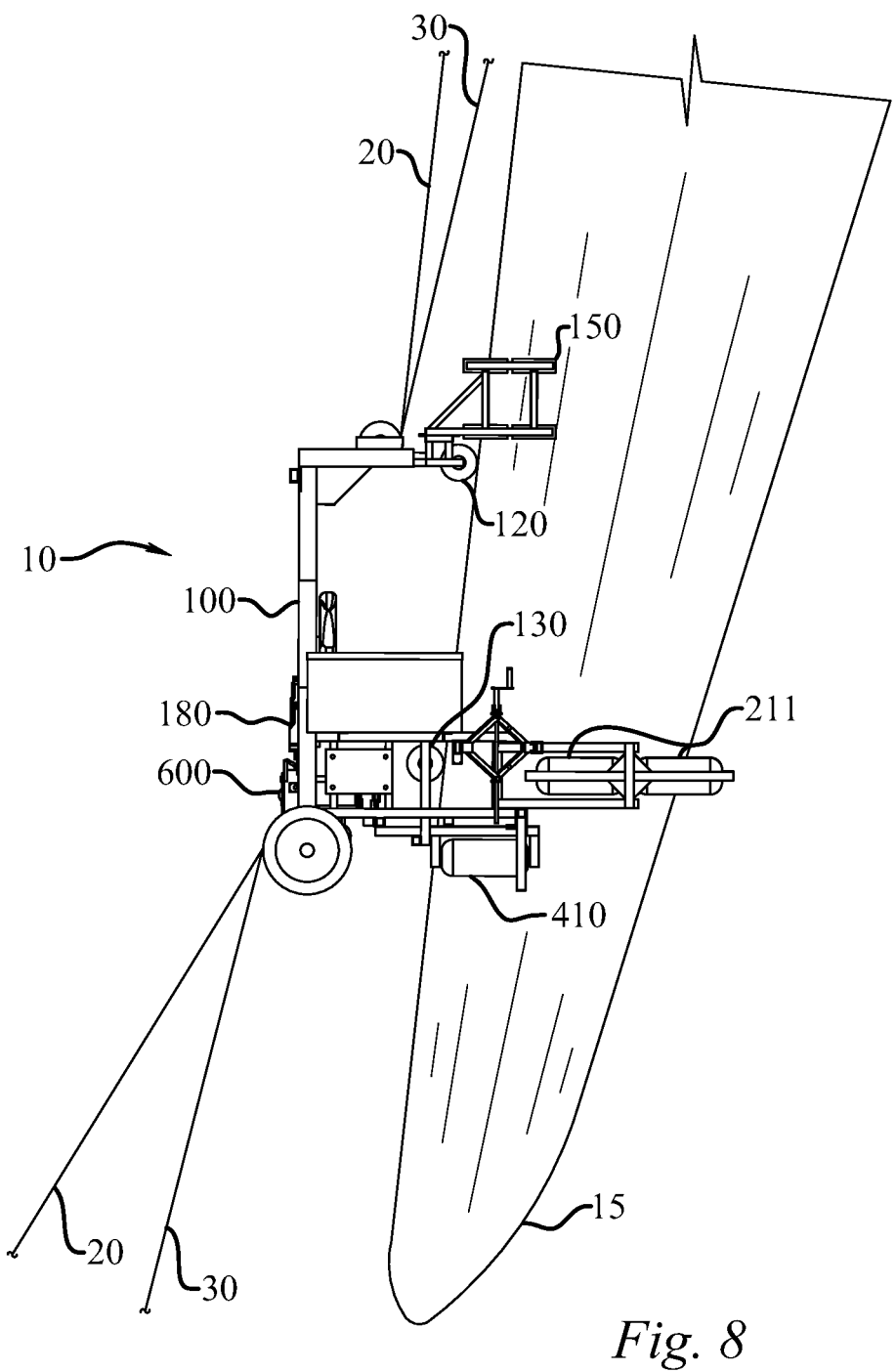
FIG. 8 is right side elevation view of an embodiment of the suspended access chair traveling along a wind turbine blade, not to scale.

Referring generally to FIGS. 1-13, a suspended access chair (10) and rescue system (700) is shown. As seen in FIG. 8, the suspended access chair (10) is configured to provide a single operator with the ability to access a wind turbine blade (15) while mounted on a tower for purposes such as inspection, maintenance, cleaning, and repair of the wind turbine blade (15). It should be noted here that the term "tower" is used throughout this specification to generally refer to a wind turbine's nacelle and hub, in addition to the actual support tower. The components of the suspended access chair (10) and rescue system (700) will now be discussed in greater detail below.

With reference now to FIG. 1, an embodiment of the suspended access chair (10) is illustrated. The suspended access chair (10) includes a chair frame assembly (100), which forms the basic supporting structure of the suspended access chair (10). The chair frame assembly (100) may include a lower base frame (101), a seat support frame (102), a back support frame (103), and an overhead frame (104). Preferably, the chair frame assembly (100) comprises a plurality of hollow tubes formed of a strong, lightweight metal. The hollow tubes may be secured to one another by welding or with mechanical fasteners, such as nuts and bolts, to form the chair frame assembly (100).

Figure 3:
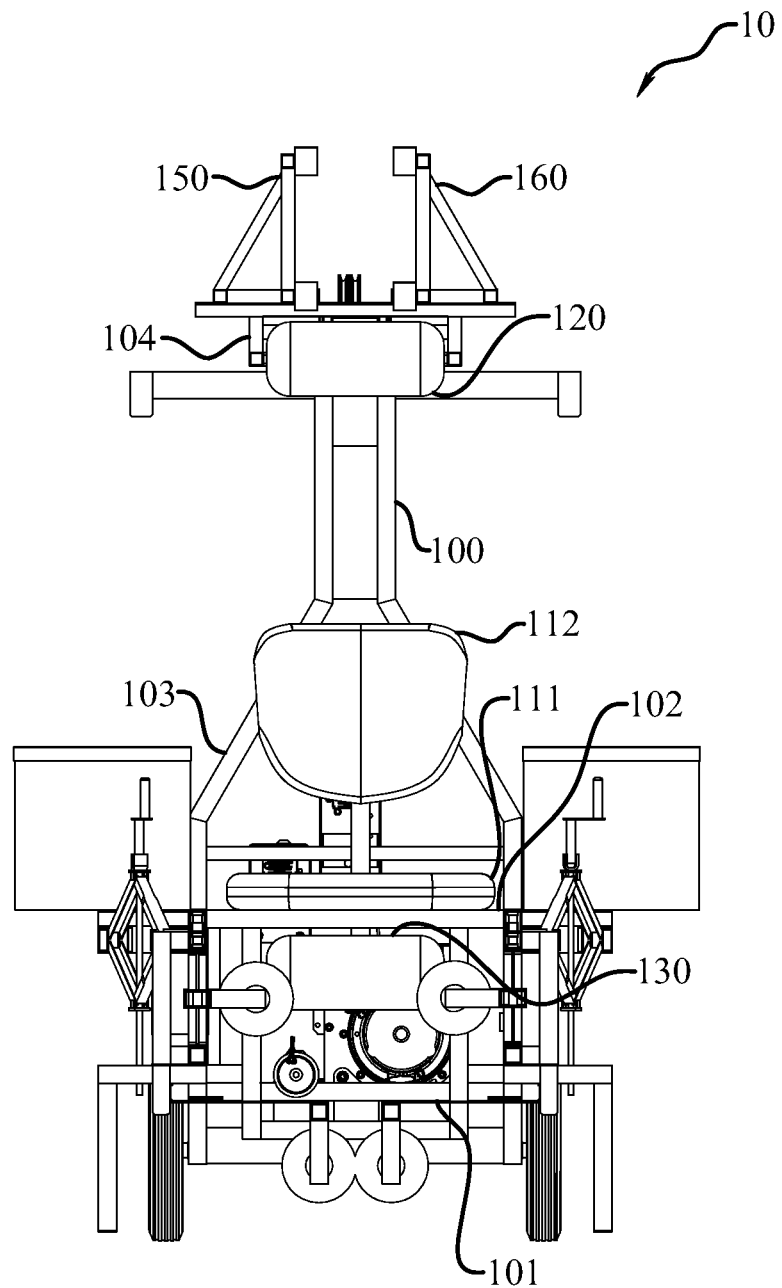
FIG. 3 is a front elevation view of an embodiment of the suspended access chair, not to scale.

The suspended access chair (10) further includes an operator seat (110) secured to the chair frame assembly (100), as seen in FIGS. 1 and 3. The operator seat (110) may include a bottom support (111) and a back rest (112). The bottom support (111) may be secured to the seat support frame (102) while the back rest (112) may be secured to the back support frame (103). Although the operator seat (110) is shown as having a separate bottom support (111) and back rest (112), the operator seat (110) may be formed with an integral bottom support (111) and back rest (112). Preferably the operator seat (110) is formed with a cushioning material, such as polyurethane foam or other viscoelastic foam materials, to provide comfortable support to the operator when using the suspended access chair (10).

Referring now to FIGS. 3 and 8, the suspended access chair (10) includes an upper frame assembly roller (120) and a lower frame assembly roller (130). The upper and lower frame assembly rollers (120, 130) are secured to the chair frame assembly (100). As seen in FIG. 3, in one embodiment, the upper frame assembly roller (120) is rotatably secured to the overhead frame (104) above the operator seat (110), while the lower frame assembly roller (130) is rotatably secured to the chair frame assembly (100) between the lower base frame (101) and the seat support frame (102) below the operator seat (110). The upper and lower frame assembly rollers (120, 130) may each be journaled about a shaft that is secured to the chair frame assembly (100) such that the upper and lower frame assembly rollers (120, 130) are capable of rotating about the shaft. The upper and lower frame assembly rollers (120, 130) are generally cylindrical in shape with each having a diameter and a length that is about three to four times greater than the diameter. For example, in one embodiment, the upper and lower frame assembly rollers (120, 130) each have a diameter of about 6 inches and a length of about 18 inches.

The upper frame assembly roller (120) and the lower frame assembly roller (130) are each secured to the chair frame assembly (100) such that the length of each roller (120, 130) extends in a generally perpendicular direction with respect to a leading edge or trailing edge of the wind turbine blade (15). As a result of the orientation of the upper frame and lower frame assembly rollers (120, 130), the suspended access chair (10) is capable of travelling along the leading or trailing edge of the wind turbine blade (15), as seen in FIG. 8.

The upper and lower frame assembly rollers (120, 130) serve several important functions. First, the upper and lower frame assembly rollers (120, 130) isolate the chair frame assembly (100) from the wind turbine blade (15) to help prevent the chair frame assembly (100) from damaging the wind turbine blade (15). This may be accomplished by securing the upper and lower frame assembly rollers (120, 130) to the chair frame assembly (100) such that the upper and lower frame assembly rollers (120, 130) extend beyond the portion of the chair frame assembly (100) to which each roller (120, 130) is secured by a distance that is equal to about half the diameter of each roller (120, 130). Thus, in an embodiment having upper and lower frame assembly rollers (120, 130) with a 6 inch diameter, the upper and lower frame assembly rollers (120, 130) would extend about 3 inches beyond the portion of the chair frame assembly (100) to which the rollers (120, 130) are secured. In order to further prevent the upper and lower frame assembly rollers (120, 130) from damaging the wind turbine blade (15), the upper and lower frame assembly rollers (120, 130) are preferably formed of resilient materials. By way of example only and not limitation, the upper and lower frame assembly rollers (120, 130) may comprise materials such as rubber, polyurethane, polyethylene, vinyl, soft elastomers, and combinations thereof, just to name a few.

Second, the upper and lower frame assembly rollers (120, 130) help stabilize and guide the suspended access chair (10) as it travels up and down the leading or trailing edge of the wind turbine blade (15). Part of the stability of the suspended access chair (10) is attributable to an upper to lower roller vertical separation distance (131), as seen in FIG. 7, and is defined as the distance between the centers of the upper and lower frame assembly rollers (120, 130) measured on a vertical line. A larger upper to lower roller vertical separation distance (131) tends to impart greater stability as compared to a smaller vertical separation distance due to a more balanced distribution of the suspended access chair's (10) weight along the wind turbine blade (15). Preferably, the upper to lower roller vertical separation distance (131) is at least fifty percent of the height of the suspended access chair (10). For example, on a suspended access chair (10) having a height of 7 feet, the upper to lower roller vertical separation distance (131) would be at least 3.5 feet. Such an embodiment ensures a high level of stability by distributing the weight of the suspended access chair (10) along the wind turbine blade (15) in a more balanced manner.

Third, the upper and lower frame assembly rollers (120, 130) impart a leveling feature to the suspended access chair (10), as seen in FIG. 8. The leveling of the suspended access chair (10) is achieved by the orientation of the upper frame assembly roller (120) with respect to the lower frame assembly roller (130). The leading edge of the upper frame assembly roller (120) may be spaced a horizontal offset distance from the leading edge of the lower frame assembly roller (130), which distance is referred to herein as the upper to lower roller offset distance (132), as seen in FIG. 7. The upper to lower roller offset distance (132) defines a separation angle, which is the angle measured from the vertical of an imaginary line between the leading edges of the upper and lower frame assembly rollers (120, 130). By providing upper and lower frame assembly rollers (120, 130) having a separation angle that matches the angle at which an edge of the wind turbine blade (15) is offset from the vertical, the suspended access chair (10) is able to stay horizontally level as it travels along the wind turbine blade (15). The leveling feature makes it easier and safer for the chair operator to carry out work on the wind turbine blade (15) by not having to struggle against gravitational forces that would otherwise be present if the suspended access chair (10) were not level. In a particular embodiment, the upper frame assembly roller (120) is adjustably secured to the chair frame assembly (100) so that the upper frame assembly roller (120) may be adjusted with respect to the lower frame assembly roller (130) to increase or decrease the upper to lower roller offset distance (132). The adjustability of the upper frame assembly roller (120) provides the suspended access chair (10) with the ability to stay horizontally level on wind turbine blades (15) that are offset from the vertical at different angles.

In addition to isolating the chair frame assembly (100) from the wind turbine blade (15), the positioning of the upper and lower frame assembly rollers (120, 130) allows the chair operator to be in close contact with the wind turbine blade (15) while carrying out inspections, maintenance, cleaning, or repair of the wind turbine blade (15). For example, in the embodiment discussed above where the lower frame assembly roller (130) extends about 3 inches beyond the chair frame assembly (100), a portion of the wind turbine blade (15) would be positioned between the chair operator's legs and within arms reach so that the wind turbine blade (15) is easily accessible.

Figure 2:
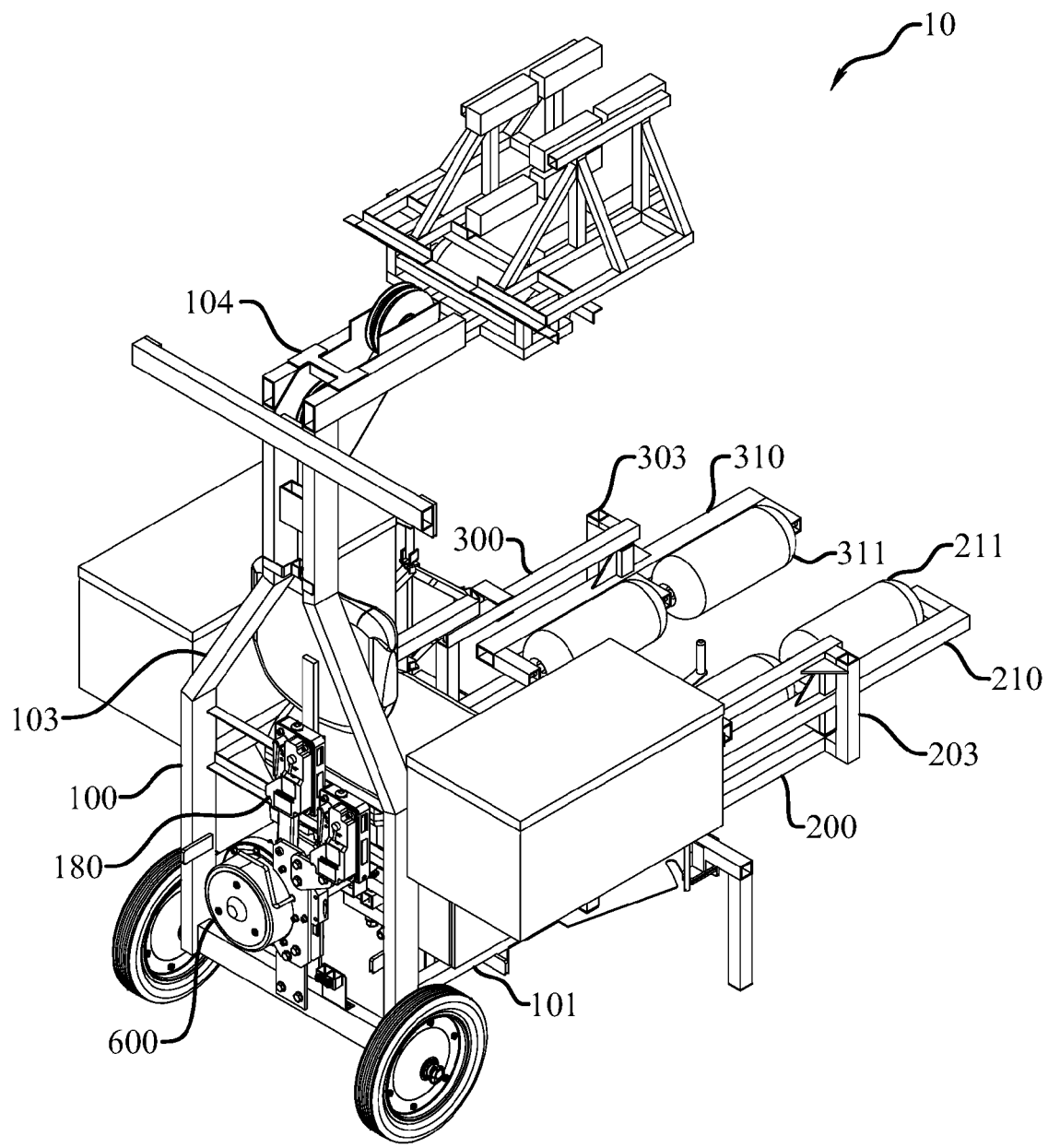
FIG. 2 is a rear perspective view of an embodiment of the suspended access chair, not to scale.
Figure 5:
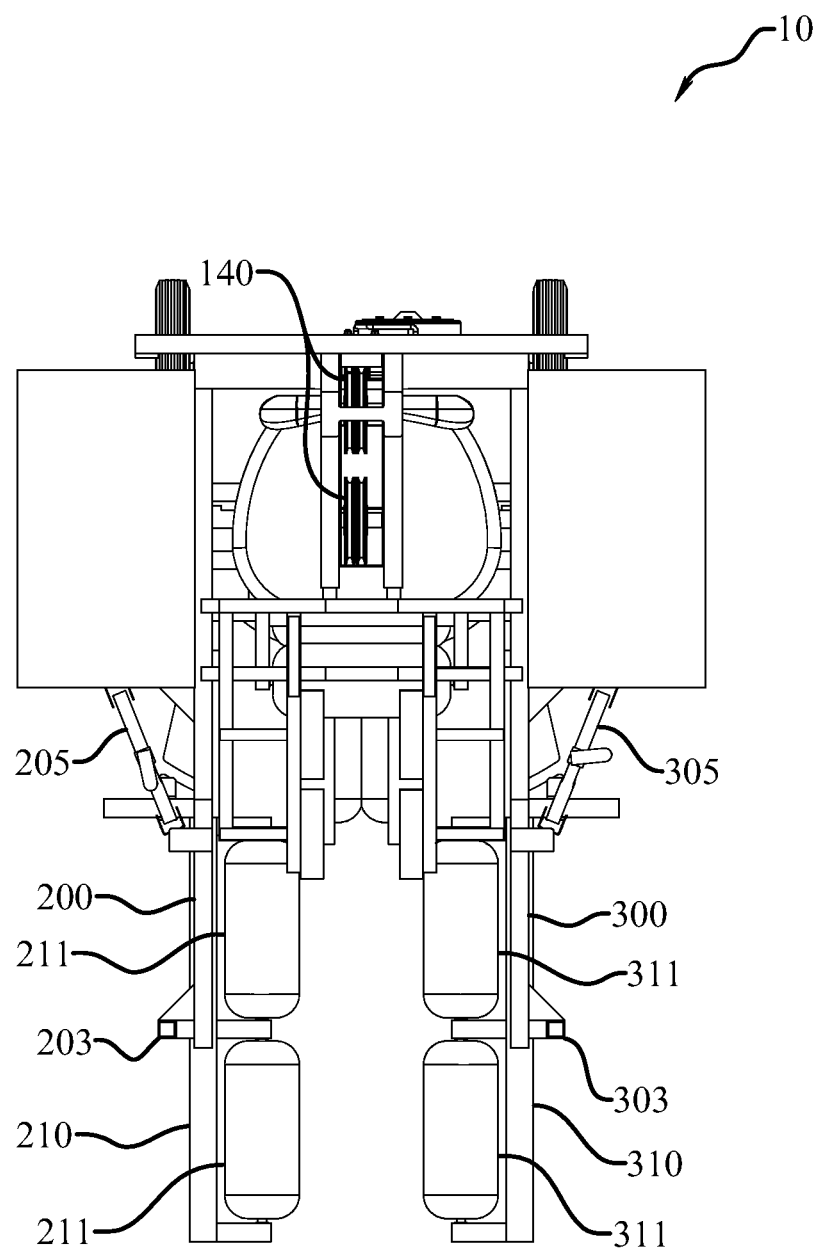
FIG. 5 is a top plan view of an embodiment of the suspended access chair, not to scale.

With reference now to FIGS. 1, 2, and 5, the suspended access chair (10) has a primary dextral gripping arm (200) and a primary sinistral gripping arm (300). The primary dextral gripping arm (200) includes a primary dextral gripping arm proximal end (201), a primary dextral gripping arm distal end (202), and at least one dextral gripping arm roller (211) configured for rolling contact along a portion of the wind turbine blade (15). Similarly, the primary sinistral gripping arm (300) has a primary sinistral gripping arm proximal end (301), a primary sinistral gripping arm distal end (302), and at least one sinistral gripping arm roller (311) configured for rolling contact along a portion of the wind turbine blade (15). The at least one dextral gripping arm roller (211) and the at least one sinistral gripping arm roller (311) are preferably positioned at a level below the operator chair (110) to provide improved stability and so as to not interfere with the operator's working area. The primary dextral and primary sinistral gripping arms (200, 300) may be formed of the same materials as discussed above for the chair frame assembly (100). Similarly, the dextral and sinistral gripping arm rollers (211, 311) may be formed of the same materials as discussed above for the upper and lower frame assembly rollers (120, 130). Moreover, the dextral and sinistral gripping arm rollers (211, 311) may each be journaled about a shaft that is secured to the primary dextral and primary sinistral gripping arms (200, 300), respectively, such that the dextral and sinistral gripping arm rollers (211, 311) are capable of rotating about the shaft.

Both the primary dextral gripping arm (200) and the primary sinistral gripping arm (300) are pivotally connected to the chair frame assembly (100). As seen in FIG. 1, the primary dextral gripping arm proximal end (201) is pivotally connected to the chair frame assembly (100), and likewise the primary sinistral gripping arm proximal end (301) is pivotally connected to the chair frame assembly (100). Although the figures show the primary dextral gripping arm (200) and the primary sinistral gripping arm (300) being pivotally connected to the chair frame assembly (100) at the lower base frame (101), the primary dextral and primary sinistral gripping arms (200, 300) may be pivotally connected to the chair frame assembly (100) at the back support frame (103), the overhead frame (104), or at any other point on the chair frame assembly (100). The pivoting connections allow the primary dextral and primary sinistral gripping arms (200, 300) to be adjusted so that the primary dextral and primary sinistral gripping arms (200, 300) are capable of conforming to the varying profile of the wind turbine blade (15) as the suspended access chair (10) travels up and down the wind turbine blade (15). As a result, the primary dextral and primary sinistral gripping arms (200, 300) and dextral and sinistral gripping arm rollers (211, 311) help stabilize and guide the suspended access chair (10) as it travels along the wind turbine blade (15).

In order to adjust the position of the primary dextral and primary sinistral gripping arms (200, 300) to conform to the varying profile of the wind turbine blade (15), the suspended access chair (10) includes a primary dextral gripping arm adjustor (205) and a primary sinistral gripping arm adjustor (305), as seen in FIGS. 1 and 5. The primary dextral gripping arm adjustor (205) is secured to the chair frame assembly (100) and the primary dextral gripping arm (200), while the primary sinistral gripping arm adjustor (305) is secured to the chair frame assembly (100) and the primary sinistral gripping arm (300). In one embodiment, the primary dextral gripping arm adjustor (205) and the primary sinistral gripping arm adjustor (305) each comprise a manually operated jackscrew device, as seen in FIG. 1. However, one with skill in the art will appreciate that the gripping arm adjustors (205, 305) may comprise virtually any type of actuating device, including mechanical actuators, hydraulic actuators, or electro-mechanical actuators, just to name a few. Preferably, the primary dextral gripping arm adjustor (205) and the primary sinistral gripping arm adjustor (305) are capable of adjusting the primary dextral and primary sinistral gripping arms (200, 300) by at least 10 degrees in toward the wind turbine blade (15) and by at least 30 degrees outward away from the wind turbine blade (15) to accommodate the varying profile of the wind turbine blade (15).

In one embodiment, the suspended access chair (10) includes a secondary dextral gripping arm (210) and a secondary sinistral gripping arm (310), as seen in FIG. 5. The secondary dextral gripping arm (210) is pivotally connected to the primary dextral gripping arm (200), and the secondary sinistral gripping arm (310) is pivotally connected to the primary sinistral gripping arm (300). The secondary dextral and secondary sinistral gripping arms (210, 310) are permitted to freely pivot with respect to the primary dextral and primary sinistral gripping arms (200, 300). However, the pivoting motion of the secondary dextral and secondary sinistral gripping arms (210, 310) is constrained by a dextral pivot stop (203) and a sinistral pivot stop (303). As seen in FIG. 1, the dextral and sinistral pivot stops (203, 303) may comprise a vertical member offset from and secured to the primary dextral and primary sinistral gripping arms (200, 300).

As with the primary dextral and primary sinistral gripping arms (200, 300), the secondary dextral and secondary sinistral gripping arms (210, 310) may be formed of the same materials as discussed above for the chair frame assembly (100). In one embodiment, the secondary dextral gripping arm (210) carries the at least one dextral gripping arm roller (211), and the secondary sinistral gripping arm (310) carries the at least one sinistral gripping arm roller (311). As seen in FIG. 5, the secondary dextral and secondary sinistral gripping arms (210, 310) each carry two gripping arm rollers (211, 311). However, one with skill in the art will recognize that additional gripping arm rollers (211, 311) may be provided. As discussed previously, the dextral and sinistral gripping arm rollers (211, 311) may each be journaled about a shaft that is secured to the secondary dextral and secondary sinistral gripping arms (210, 310), respectively, such that the dextral and sinistral gripping arm rollers (211, 311) are capable of rotating about the shaft.

In addition to the advantages afforded by the individual components of the suspended access chair (10), a number of benefits are provided as a result of the unique orientation and relationships among the components. As noted above, the upper to lower roller vertical separation distance (131) contributes to the stability of the suspended access chair (10). Additionally, the upper to lower roller vertical separation distance (131) is related to a lower roller to gripping arm roller distance (220), which is defined as the horizontal distance from the leading edge of the lower frame assembly roller (130) to the most distal end of the dextral and sinistral gripping arm rollers (211, 311), as seen in FIG. 7. For example, in one embodiment, the lower roller to gripping arm roller distance (220) is greater than or equal to the upper to lower roller vertical separation distance (131). This embodiment further contributes to the stability of the suspended access chair (10) by ensuring that there is weight toward the front end of the suspended access chair (10) to provide balance. Also, this embodiment provides the ability to control the location of the center of gravity of the suspended access chair (10), which further improves stability.

The upper to lower roller vertical separation distance (131) is also related to a lower roller to gripping arm pivot distance (320), which is defined as the horizontal distance from the leading edge of the lower frame assembly roller (130) to the pivotal connection between the secondary dextral gripping arm (210) and primary dextral gripping arm (200) and to the pivotal connection between the secondary sinistral gripping arm (310) and the primary sinistral gripping arm (300), as seen in FIG. 7. For instance, in one embodiment, the upper to lower roller vertical separation distance (131) is greater than or equal to the lower roller to gripping arm pivot distance (320). This embodiment provides the suspended access chair (10) with great flexibility for utilization on wind turbine blades (15) having different sizes and blade profiles.

Still other unique relationships have been identified with respect to the upper to lower roller offset distance (132), i.e., the horizontal distance that the leading edge of the upper frame assembly roller (120) extends in front of the leading edge of the lower frame assembly roller (130). For example, in one embodiment, the upper to lower roller offset distance (132) is at least 10 percent of the lower roller to gripping arm roller distance (220). Such a relationship further adds to the stability of the suspended access chair (10) and allows flexibility for use on wind turbine blades (15) of different sizes and blade profiles. However, the upper to lower roller offset distance (132) should not be so large that the stability of the suspended access chair (10) is compromised. Thus, in another embodiment, the upper to lower roller offset distance (132) is less than or equal to 50 percent of the lower roller to gripping arm roller distance (220).

Another relationship involves the upper to lower roller offset distance (132) and the upper to lower roller vertical separation distance (131). In one embodiment, the upper to lower roller offset distance (132) is at least 10 percent of the upper to lower roller vertical separation distance (131). This relationship also contributes to the stability and safety of the suspended access chair (10) by allowing the suspended access chair (10) to stay substantially horizontally level when ascending and descending a wind turbine blade (15). On the other hand, the upper to lower roller offset distance (132) must not be so large that the suspended access chair (10) would tilt back and away from the wind turbine blade (15) when the upper and lower frame assembly rollers (120, 130) are in rolling contact with the blade (15). Therefore, in another embodiment, the upper to lower roller offset distance (132) is less than or equal to 50 percent of the upper to lower roller vertical separation distance (131).

Another aspect of the suspended access chair (10) is the rotational range of the secondary dextral and secondary sinistral gripping arms (210, 310) with respect to the adjustability of the primary dextral and primary sinistral gripping arms (200, 300). As noted previously, the primary dextral and primary sinistral gripping arms (200, 300) may be adjusted from a substantially straight line configuration with respect to the chair frame assembly (100) by at least 10 degrees in toward the wind turbine blade (15) and by at least 30 degrees outward away from the wind turbine blade (15). The adjustability of the primary dextral and primary sinistral gripping arms (200, 300) allows the gripping arms (200, 300) to open up wide enough to accept wind turbine blades (15) of different widths and profiles. The rotational range of the secondary dextral and secondary sinistral gripping arms (210, 310) with respect to the adjustability of the primary dextral and primary sinistral gripping arms (200, 300) permits the suspended access chair to effectively grip wind turbine blades (15) of various widths and blade profiles. For example, in one embodiment, the secondary dextral and secondary sinistral gripping arms (210, 310) are capable of rotating at least 30 degrees, in both the clockwise and counter-clockwise directions, with respect to the primary dextral and primary sinistral gripping arms (200, 300). Thus, as the primary dextral and primary sinistral gripping arms (200, 300) are adjusted away from the blade (15) to accommodate the widest portion of the blade (15), the secondary dextral and secondary sinistral gripping arms (210, 310) may be rotated in toward the blade (15) to grip a portion of the blade (15) beyond the widest portion.

Figure 6:
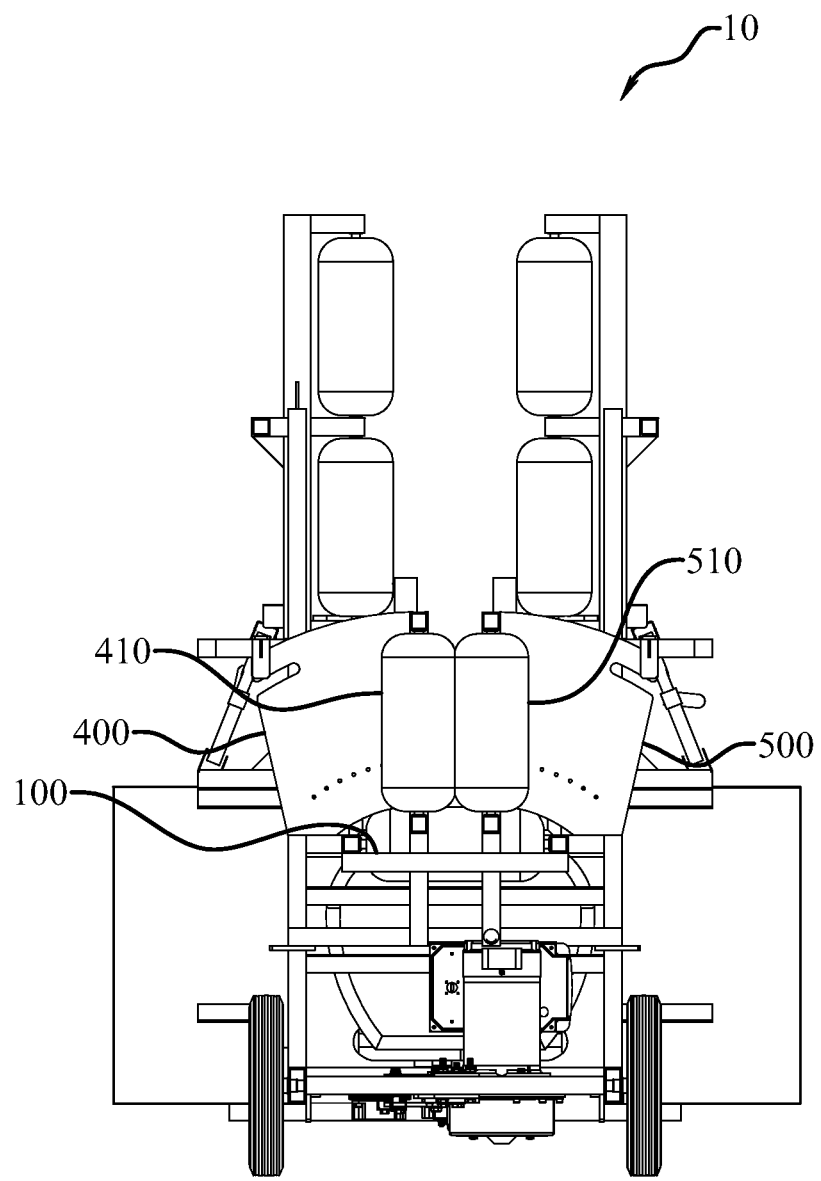
FIG. 6 is a bottom plan view of an embodiment of the suspended access chair, not to scale.

Referring now to FIG. 6, in one embodiment, the suspended access chair (10) includes a dextral foot tray (400) and a sinistral foot tray (500) to support the feet of the chair operator. The dextral and sinistral foot trays (400, 500) are pivotally connected to the chair frame assembly (100). As seen in FIG. 6, the dextral foot tray (400) includes a dextral foot tray roller (410) and the sinistral foot tray (500) includes a sinistral foot tray roller (510). The dextral and sinistral foot tray rollers (410, 510) are preferably located beneath the dextral and sinistral foot trays (400, 500) so as to not interfere with the feet of the chair operator. Moreover, the dextral and sinistral foot tray rollers (410, 510) are located at a level below that of the dextral and sinistral gripping arm rollers (211, 311) to provide a high level of stability. The dextral and sinistral foot tray rollers (410, 510) may each be journaled about a shaft that is secured to mounting brackets that extend beneath the dextral and sinistral foot trays (400, 500), respectively, such that the dextral and sinistral foot tray rollers (410, 510) are capable of rotating about the shaft. The pivoting connections allow the dextral and sinistral foot trays (400, 500) to be adjusted so that the dextral and sinistral foot tray rollers (410, 510) are placed in rolling contact with the wind turbine blade (15) and are capable of conforming to the varying profile of the wind turbine blade (15) as the suspended access chair (10) travels up and down the wind turbine blade (15). Thus, the dextral and sinistral foot tray rollers (410, 510) help further stabilize and guide the suspended access chair (10) as it travels along the wind turbine blade (15). In one embodiment, the dextral and sinistral foot trays (400, 500) are formed with a series of locking holes that permit the foot trays (400, 500) to be locked into a selected position with respect to the chair frame assembly (100) by passing a locking pin through one of the locking holes and a portion of the chair frame assembly (100). As a result, the chair operator may selectively lock the position of the foot trays (400, 500) to closely correspond to the profile of the blade (15), such as when the chair operator has stopped operating the suspended access chair (10) to perform work at a specific location on the wind turbine blade (15).

In another embodiment, the suspended access chair (10) includes a dextral blade tip stabilizer (150) secured to the chair frame assembly (100) and a sinistral blade tip stabilizer (160) secured to the chair frame assembly (100), as seen in FIG. 3. Each blade tip stabilizer (150, 160) generally comprises a bracket having at least one bumper for contacting the wind turbine blade (15). The blade tip stabilizers (150, 160) are preferably removably secured, such as by bolted connections, to the overhead frame (104) of the chair frame assembly (100). The blade tip stabilizers (150, 160) may be provided with a series of mounting holes so that the width between the dextral and sinistral blade tip stabilizers (150, 160) may be adjusted to accommodate various sizes of wind turbine blades (15). The dextral and sinistral blade tip stabilizers (150, 160) are configured to stabilize a portion of the suspended access chair (10) with respect to the wind turbine blade (15). For example, when the suspended access chair (10) approaches the tip of the wind turbine blade (15), the suspended access chair (10) may be maneuvered so that the tip of the wind turbine blade (15) is positioned between the dextral and sinistral blade tip stabilizers (150, 160). In this position, the dextral and sinistral blade tip stabilizers (150, 160) constrain the tip of the wind turbine blade (15), which stabilizes the upper portion of the suspended access chair (10) with respect to the blade (15) and helps guide the suspended access chair (10) as it is raised and lowered.

Figure 4:
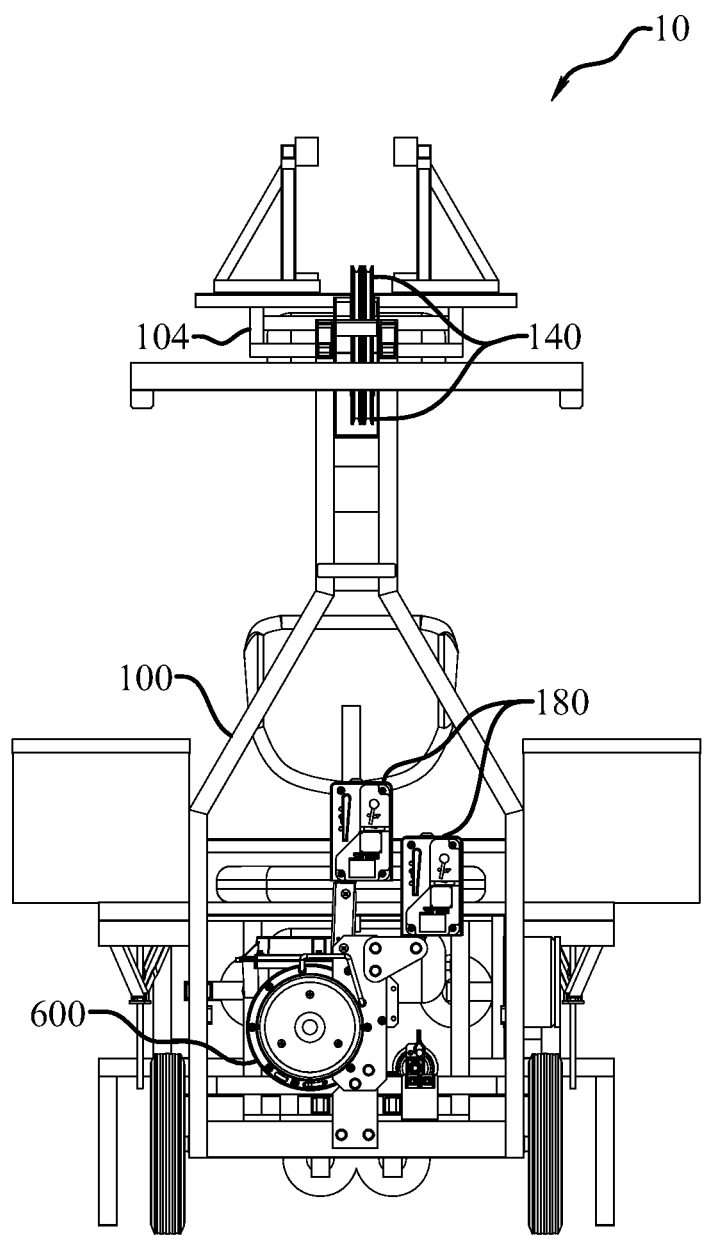
FIG. 4 is a rear elevation view of an embodiment of the suspended access chair, not to scale.

Referring now to FIGS. 2 and 4, the suspended access chair (10) includes a hoist (600) mounted on the chair frame assembly (100). The hoist (600) raises and lowers the suspended access chair (10) along a suspension rope (20), seen in FIG. 8, to allow the chair operator to gain access to the wind turbine blade (15). The suspension rope (20) may comprise a steel wire rope with a polypropylene core, or other types of rope or cable that are suitable for use in suspended access applications. Preferably, the hoist (600) is a traction hoist that is capable of climbing up and down a wire rope. One example of such a hoist is the "Compact 400 S" electrical hoist available from Sky Climber, LLC. As seen in FIG. 2, the hoist (600) may be positioned below the operator seat (110). The hoist (600) may include a pendant control box for controlling the operation of the hoist (600). The pendant control box includes an "up" button to command the hoist (600) to climb up the suspension rope (20) to raise the chair (10), a "down" button to command the hoist (600) to climb down the suspension rope (20) to lower the chair (10), and an "emergency stop" button.

With reference now to FIGS. 4 and 5, the suspended access chair (10) may include a pulley system (140). As seen in FIG. 4, the pulley system (140) may be secured to the overhead frame (104). The primary function of the pulley system (140) is to guide the suspension rope (20) and a secondary rope (30). Preferably, the secondary rope (30) comprises a steel wire rope with a polypropylene core, or other types of rope or cable that are suitable for use in suspended access applications. As seen in FIG. 5, the pulley system (140) is offset (e.g., offset in a front-to-rear direction) so that the suspension rope (20) and secondary rope (30) are positioned directly above the operator seat (110). When preparing the suspended access chair (10) for use, the suspension rope (20) and the secondary rope (30) are first reeved through the pulley system (400). Next, the secondary rope (30) is reeved through a rope lock device (180). The rope lock device (180) is secured to the chair frame assembly (100) and is capable of preventing unintentional descent of the suspended access chair (10). One example of a suitable rope lock device (180) is the "Sky Lock III" over-speed brake available from Sky Climber, LLC. In one embodiment, a second rope lock device (180) may be utilized in connection with the suspension rope (20) to provide a redundant fall prevention safety system. Next, the suspension rope (20) is reeved through the hoist (600). The suspended access chair (10) may also include guiding springs or conduits secured to the chair frame assembly (100) for separately receiving the suspension rope (20) and the secondary rope (30) to help guide the ropes (20, 30) and prevent the ropes (20, 30) from becoming entangled when utilizing the suspended access chair (10). Finally, the ends of the suspension rope (20) and the secondary rope (30) are secured to counterweights.

In another embodiment, the suspended access chair (10) includes at least one tool box (170) secured to the chair frame assembly (100), as seen in FIG. 1. The at least one tool box (170) is configured to house the various tools and supplies needed to repair, inspect, or clean the wind turbine blade (15). One or more power supply outlets (not shown) may be provided in, or on, the at least one tool box (170) so that the chair operator may utilize various power tools, such as grinders and saws, to repair damaged portions of the wind turbine blade (15).

The suspended access chair (10) may also feature a number of attach points and anchoring points on the chair frame assembly (100). For example, the chair frame assembly (100) may include two attach points located on each side of the seat support frame (102) that allows the operator to attach to the waist belt of a fall arrest harness. Additionally, the chair frame assembly (100) may include an attach point positioned on the back support frame (103) or overhead frame (104) that allows the operator to attach one end of a short life-line, with the other end of the life-line being secured to the operator's fall arrest harness. Still further, the chair frame assembly (100) may feature anchoring points that allow for the connection of one or more assistance ropes. The assistance ropes provide a ground assistant with the ability to help stabilize the suspended access chair (10), and to assist the operator with positioning the suspended access chair (10) as it approaches the tip of the wind turbine blade (15). When the operator reaches the tip of the wind turbine blade (15), an adjustable lanyard may be looped around the blade (15) and secured to the suspended access chair (10). The adjustable lanyard helps prevent the suspended access chair (10) from disengaging the blade (15) in the case of sudden high wind gusts.

Figure 9:
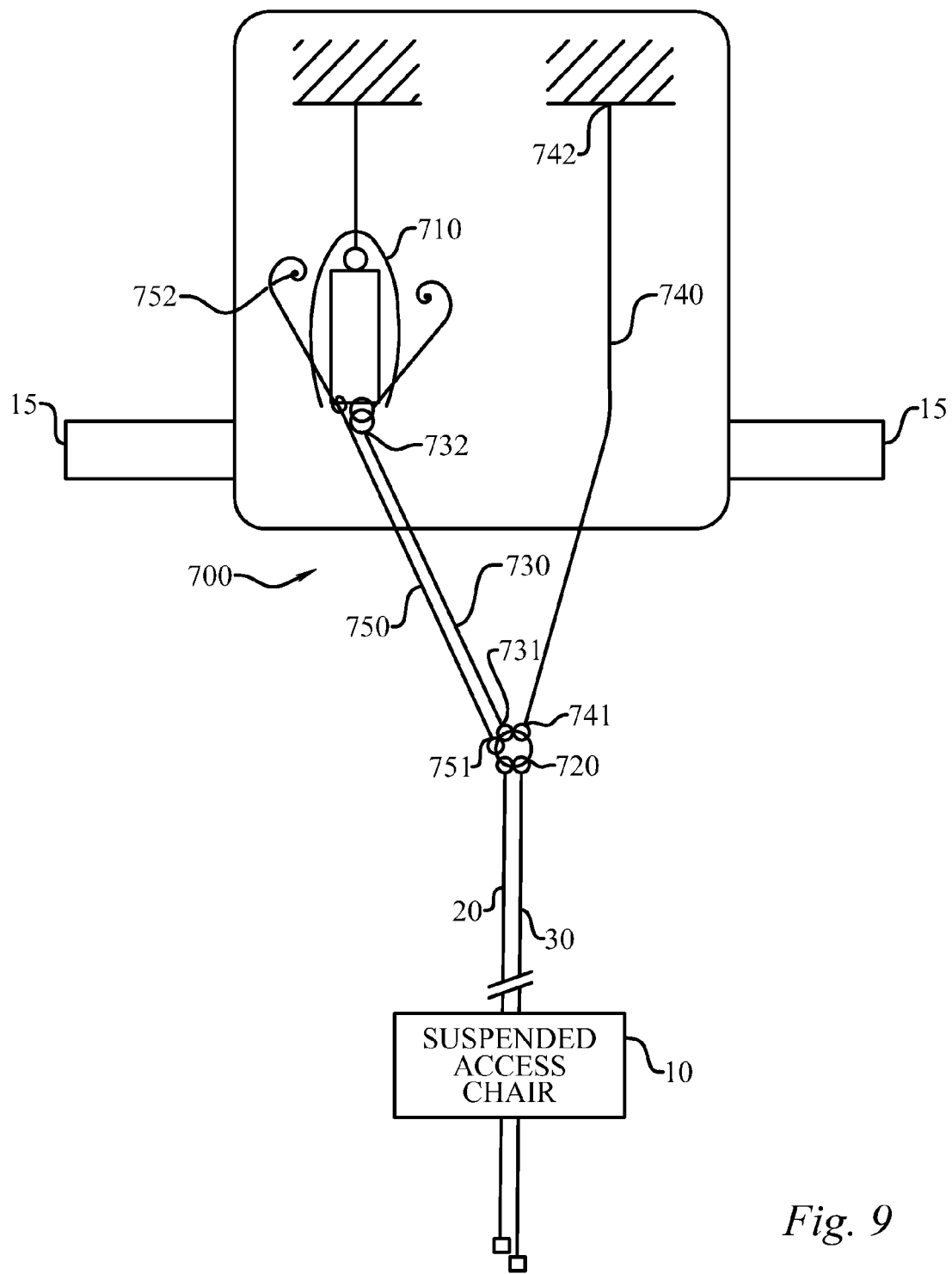
FIG. 9 is a schematic of an embodiment of the suspended access chair and rescue system, not to scale.

Referring now to FIGS. 9-13, an embodiment of the rescue system (700) for lowering the suspended access chair (10) from an elevated position to the ground is shown. The rescue system (700) is especially useful for lowering the suspended access chair (10) in situations where the hoist (600) loses power, the rope lock device (180) is tripped, or the chair operator becomes incapacitated. As seen in FIG. 9, the rescue system (700) is a part of the suspension rigging for the suspended access chair (10), and as a result, the suspended access chair (10) is suspended in a "rig-to-rescue" configuration that allows for a quick rescue without having to call upon or utilize a trained rescue team. The components of the rescue system (700) and its operation will be discussed in detail below.

Figure 11:
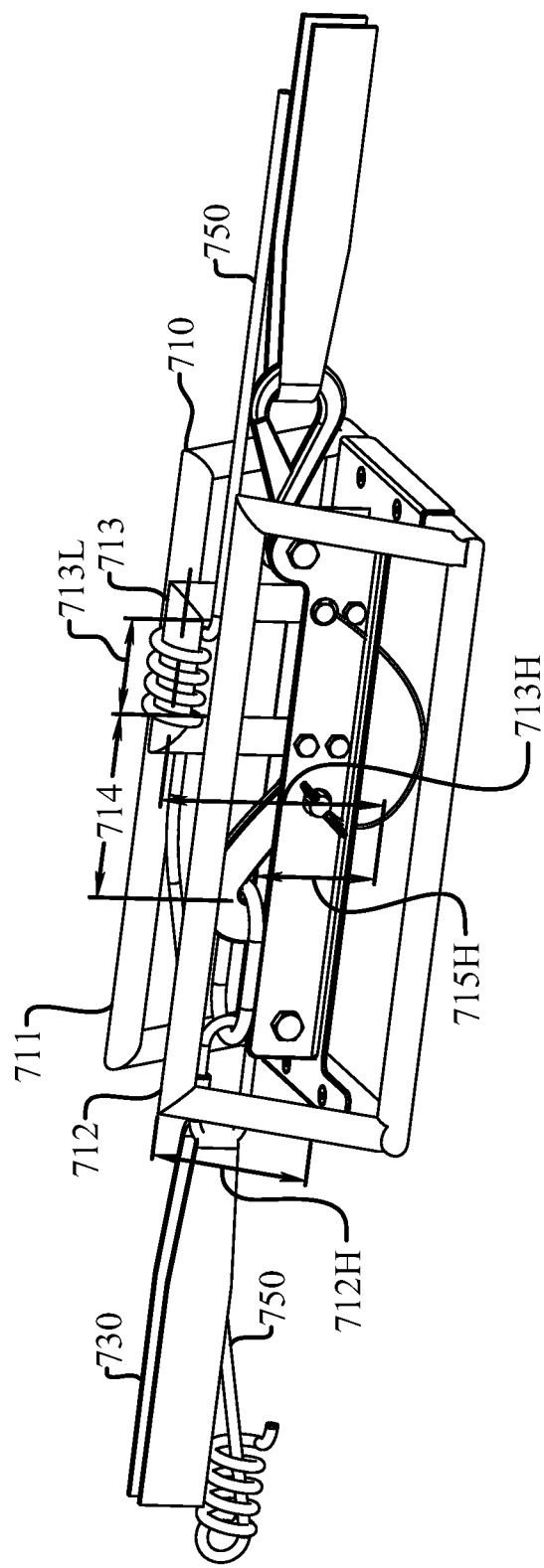
FIG. 11 is a perspective view of an embodiment of a portion of the rescue system, not to scale.
Figure 12:
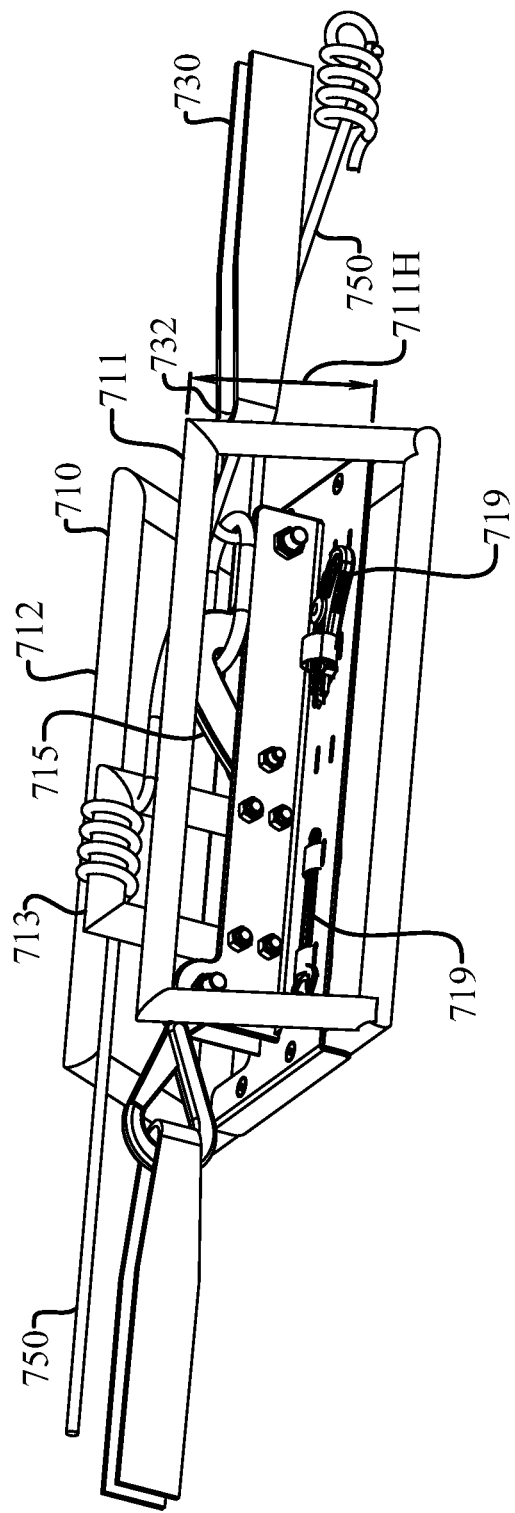
FIG. 12 is a perspective view of an embodiment of a portion of the rescue system, not to scale.
Figure 13:
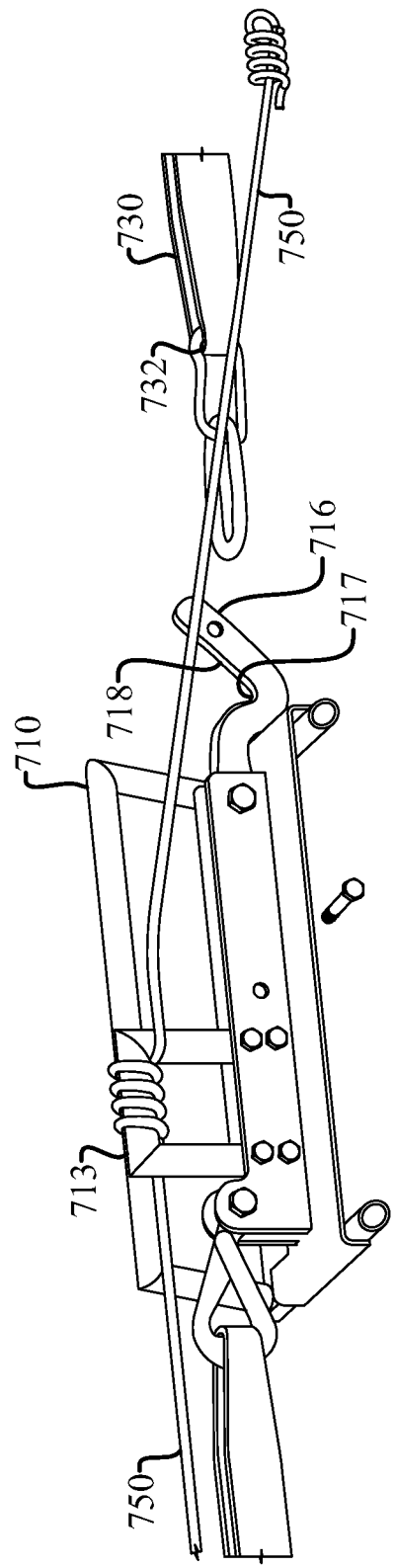
FIG. 13 is a perspective view of an embodiment of a portion of the rescue system, not to scale.

As seen in FIGS. 11-13, the rescue system (700) includes a rescue support frame (710) having a friction brake (713) and a release device (715) capable of moving from a locked position to a released position. The rescue support frame (710) may be formed of a strong, lightweight metal and is configured to be easily transported and installed for use on any wind turbine for which the suspended access chair (10) is utilized. Preferably, the rescue support frame (710) is releasably secured to a portion of the tower. The releasable securing of the rescue support frame (710) may be accomplished by bolting the rescue support frame (710) to a portion of the tower, or preferably by utilizing a textile sling, or other type of rigging line, that is releasably secured to a portion of the tower and a portion of the rescue support frame (710).

Figure 10:
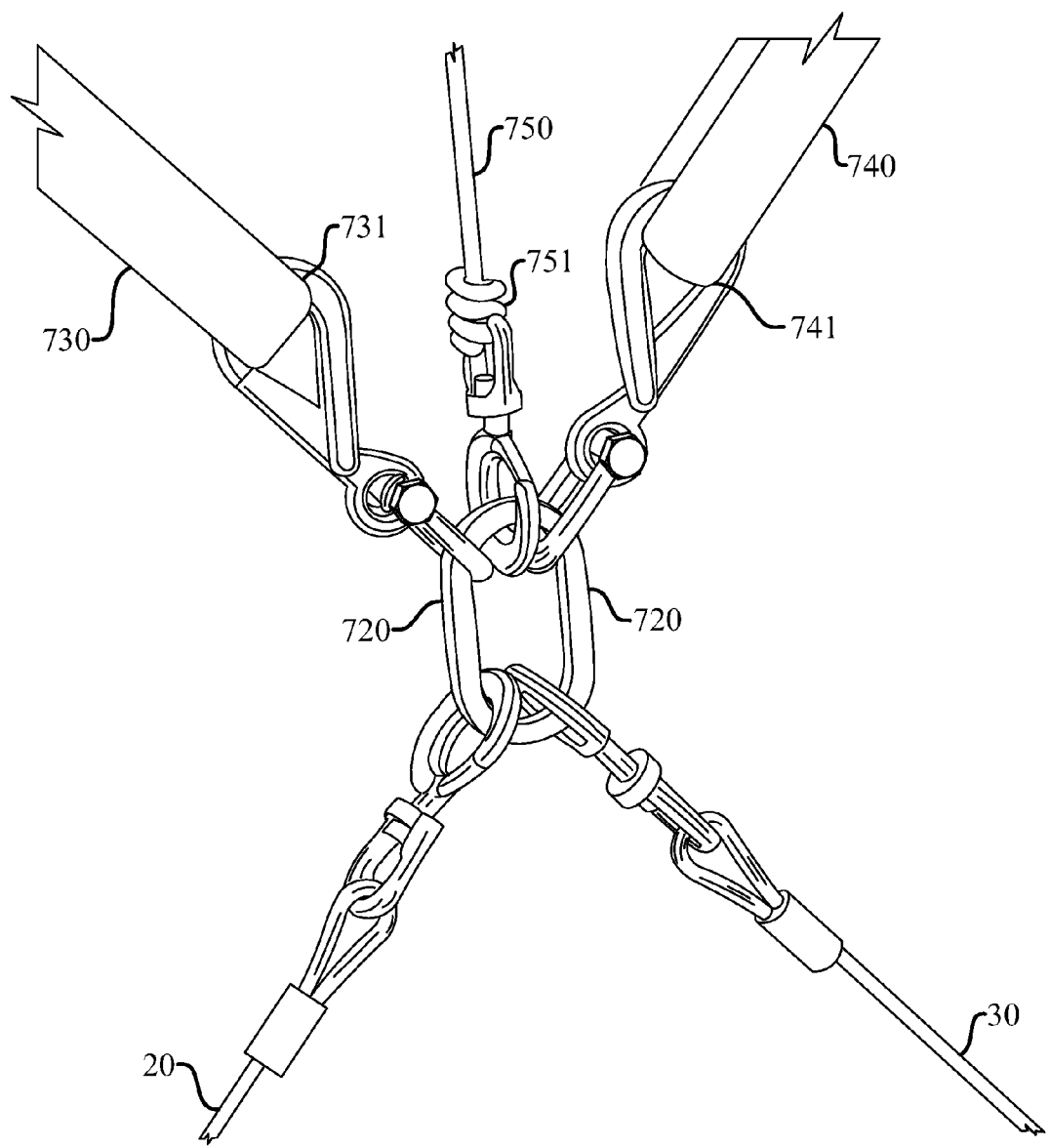
FIG. 10 is a perspective view of an embodiment of a portion of the rescue system, not to scale.

Referring now to FIGS. 9-10, the rescue system (700) further includes at least one rigging support ring (720). The at least one rigging support ring (720) serves as the master link for the suspension rigging of the suspended access chair (10). Preferably, two rigging support rings (720) are utilized to provide improved strength and additional safety. As seen in FIG. 10, the suspension rope (20), along which the suspended access chair (10) climbs, and the secondary rope (30) are each secured to the at least one rigging support ring (720).

The rescue system (700) also includes a first rigging line (730) and a second rigging line (740), as shown in FIGS. 9 and 10. The first rigging line (730) has a first rigging line proximal end (731) and a first rigging line distal end (732), wherein the first rigging line proximal end (731) is secured to the at least one rigging support ring (720), as seen in FIG. 10, and the first rigging line distal end (732) is secured to the release device (715) when the release device (715) is in the locked position, as illustrated in FIG. 12. Similarly, the second rigging line (740) has a second rigging line proximal end (741) and a second rigging line distal end (742), wherein the second rigging line proximal end (741) is secured to the at least one rigging support ring (720), as shown in FIG. 10, and the second rigging line distal end (742) is secured to the tower, as depicted in FIG. 9. Preferably, the first and second rigging lines (730, 740) are textile slings, which include slings made from natural fibers or synthetic fibers, all types of webbing slings, and endless roundslings, just to name a few. Textile slings are preferred so as to not cause damage to the wind turbine blades (15). However, the first and second rigging lines (730, 740) may be wire ropes, chains, or any other type of line utilized in the hoisting and rigging field.

The next component of the rescue system (700) is the rescue rope (750), as seen in FIGS. 9-13. The rescue rope (750) has a rescue rope proximal end (751) and a rescue rope distal end (752). In one embodiment, the rescue rope proximal end (751) is secured to the at least one rigging support ring (720), as seen in FIG. 10, and a portion of the rescue rope (750) between the rescue rope proximal end (751) and the rescue rope distal end (752) is wound around the friction brake (713), seen well in FIG. 11. In a particular embodiment, the rescue rope (750) is a 12.5 mm (diameter) semi-static nylon rope. In an alternative embodiment, the rescue rope proximal end (751) is secured to the first rigging line (730) at the first rigging line distal end (732), rather than being secured directly to the at least one rigging support ring (720).

In securing together components of the rescue system (700), such as the at least one rigging support ring (720), the first and second rigging lines (730, 740), and the rescue rope (750), virtually any type of connector used in rigging applications may be utilized. For example, web sling connectors, shackle type connectors, latched clevis hooks, and carabiners are just a few of the types of connectors that may be suitable for use in securing various components of the rescue system (700).

In one particular embodiment the release device (715) may be a pivot arm (716) as seen pivoting from a locked position in FIG. 12 to an unlocked position in FIG. 13. In this embodiment the release device (715) pivots in a direction substantially parallel to the tensile load on the first rigging line (730). As seen in FIG. 12, and partially in FIG. 13, the rescue support frame (700) may be configured so that in order for a user to activate the movement of the release device (715) from the locked position to the unlocked position the user's hands must be in a location that does not interfere with the movement of the release device (715) or the travel path of the released portion of the first rigging line (730). In the embodiment illustrated, both hands of the operator must be used to remove the bolt that allows movement of the release device (715) from the locked position to the unlocked position, thereby transferring the entire tensile load from the first rigging line (730) to the rescue rope (750). Further, the rescue rope (750) is immediately tensioned by the load which can cause movement of the rescue rope (750). Thus, the rescue support frame (710) illustrated in FIGS. 12 and 13 further prevents a user's hand from becoming pinched or entangled in the rescue rope (750) as it becomes the sole carrier of the suspended load. The release device (715) may incorporate any design that securely retains the first rigging line (730) under a significant load in the locked position, yet allows the user to safely and quickly transfer the load to the rescue rope (750) by changing the position from the release device (715) from the locked position to the unlocked position.

For instance, the rescue support frame (710) may include at least one guard to prevent unintended contact with moving parts. In one embodiment the rescue support frame (710) includes both a sinistral guard (711) and a dextral guard (712). The sinistral guard (711) extends to an elevation above the mounting surface of the rescue support frame (710) known as the sinistral guard height (711H), seen in FIG. 12. Likewise, the dextral guard (712) extends to an elevation above the mounting surface of the rescue support frame (710) known as the dextral guard height (712H), seen in FIG. 11. The friction brake (713) has a friction brake length (713L), which is the linear length of the intended wrapping surface. Further, the friction brake (713) has a friction brake height (713H), which is the elevation of the longitudinal axis of the friction brake (713) above the mounting surface of the rescue support frame (710). In one particular embodiment the design of the guards (711, 712) and the friction brake (713) further minimize the likelihood of accidental injuries by having the sinistral guard height (711H) and dextral guard height (712H) within a distance of one diameter of the friction brake from the friction brake height (713H) such that the rescue rope (750) enters and leaves the bottom surface of the friction brake (713) at an elevation below the top of the guards (711, 712).

The location at which the first rigging line (730) is connected to the rescue system (700) defines a distance referred to as a brake-to-rigging offset (714), as seen in FIG. 11, which is the distance from the shortest distance from the friction brake (713) to the connection point of the first rigging line (730). The brake-to-rigging offset (714) is preferably less than ten times the friction brake length (713L) to ensure safe transfer of the tensile load from the first rigging line (730) to the rescue rope (750) and the rescue support frame (710) with minimal occupant discomfort and reduced stress on the rescue rope (750) and the rescue support frame (710). In an even further embodiment these benefits are extended when the brake-to-rigging offset (714) is preferably less than five times the friction brake length (713L).

Yet another embodiment enhances safe transfer of the tensile load from the first rigging line (730) to the rescue rope (750) and the rescue support frame (710) with minimal occupant discomfort and reduced stress on the rescue rope (750) and the rescue support frame (710) by incorporating a pivot arm (716) into the release device (715). The sequence of operation of the release device (715) and the pivot arm (716) will be discussed below, however certain embodiments of the pivot arm (716) embodiment will be described here. One embodiment of the pivot arm (716) includes a nestling region (717), as seen in FIG. 13. The nestling region (717) is designed to cooperate with the termination structure of the first rigging line (730) so that during normal operation the termination structure remains securely in one location rather than moving with the swaying of the first rigging line (730). Preventing the contact point from translating, while accommodating a certain degree of rotation, reduces the likelihood that either the release device (715) or the first rigging line (730) will prematurely wear and fail due to too rigid a connection, or alternatively too loose of a connection.

A still further embodiment ensures a safe and controlled release of the first rigging line (730) from the release device (715). One such embodiment controls the release by incorporating a release direction region (718) into the pivot arm (716), as seen in FIG. 13. In this particular embodiment, the nestling region (717) has a smooth transition to the release direction region (718) so that the tensile force on the first rigging line (730) rotates the pivot arm (716) open and the shape of the release direction region (718) facilitates a controlled release of the first rigging line free of potential snags on the release device (715) itself and preventing interference and wrapping around the rescue rope (750). As seen in FIG. 11 the release device (715) secures the first rigging line (730) at a release device engagement height (715H). One particular embodiment reduces the likelihood of interference with the friction brake (713) by having a release device engagement height (715H) that is less than 60% of the friction brake height (713H).

Now that the components of the rescue system (700) have been introduced, the steps for utilizing the rescue system (700) will be described. As previously mentioned, the rescue system (700) is a part of the suspension rigging and is used to lower the suspended access chair (10) in emergency situations such as when the hoist (600) loses power, the rope lock device (180) is tripped, or the chair operator becomes incapacitated. An embodiment of the suspension rigging configuration for the suspended access chair (10) and rescue system (700) is schematically shown in FIG. 9.

The first step for utilizing the rescue system (700) to lower the suspended access chair (10) is to cause the second rigging line (740) to disengage the tower. For example, the second rigging line (740) may be cut through at a point between the second rigging line proximal end (741) and the second rigging line distal end (742) so that the second rigging line (740) no longer helps support the suspended load (i.e., the suspended access chair (10)). In one particular embodiment, a cutting tool (719), such as a knife or box cutter, may be releasably secured to the rescue support frame (710), as seen in FIG. 12. Any releasable securing method may be utilized including, but not limited to, hook and loop fasteners and magnetic connectors, just to name a couple. When the second rigging line (740) disengages the tower, the suspended load will be transferred to and supported by the various connections between the tower, the rescue support frame (710), the first rigging line (730), the at least one rigging support ring (720), and the suspension and secondary ropes (20, 30).

In an alternative embodiment, the rescue system (700) may incorporate a second rescue support frame (710) having a friction brake (713) and a release device (715) capable of moving from a locked position to a released position. Just as with the first rescue support frame (710), the second rescue support frame (710) may be releasably secured to a portion of the tower such as by bolting the second rescue support frame (710) to a portion of the tower, or preferably by utilizing a textile sling, or other type of rigging line, that is releasably secured to a portion of the tower and a portion of the second rescue support frame (710). In this particular embodiment, the second rigging line proximal end (741) is secured to the at least one rigging support ring (720), and the second rigging line distal end (742) is secured to the release device (715) of the second rescue support frame (710) when the release device (715) is in the locked position. Thus, instead of having to cut through the second rigging line (740), the second rigging line distal end (742) may be released via the release device (715) so that the second rigging line (740) disengages the tower and no longer helps support the suspended load (i.e., the suspended access chair (10)). This particular embodiment eliminates the risk that a wrong line will be cut when encountering the stress of an emergency situation.

The next step for utilizing the rescue system (700) to lower the suspended access chair (10) is to release the first rigging line (730) from the rescue support frame (710). To accomplish this, the release device (715) is caused to move to the released position to release the first rigging line distal end (732), as seen in FIG. 13. When the rescue system (700) is not being utilized to lower the suspended access chair (10), the release device (715) is maintained in the locked position, as seen in FIG. 12. In one embodiment, the release device (715) includes a pivot arm (716) that is retained in the locked position with a bolted connection that passes through the rescue support frame (710) and the release device (715), as seen in FIGS. 11 and 12. Thus, in order to allow the release device (715) to pivot to the released position, the bolted connection between the rescue support frame (710) and the release device (715) must be removed. For example, a hand tool (719), such as a wrench, may be used to remove the nut from the bolt. In a particular embodiment, the hand tool (719) may be releasably secured to the rescue support frame (710), as seen in FIG. 12. Any releasable securing method may be utilized including, but not limited to, hook and loop fasteners and magnetic connectors, just to name a couple. After the nut is removed, the bolt is removed from the release device (715) and the rescue support frame (710). Upon removal of the bolt, the release device (715), under the weight of the suspended load, pivots to the released position and releases the first rigging line distal end (732), as seen in FIG. 13.

At this point, the rescue rope (750) will be supporting the suspended access chair (10) through its connection to the friction brake (713) of the rescue support frame (710) and its connection either directly to the at least one rigging support ring (720), to which the suspension and secondary ropes (20, 30) are connected, or through the rescue rope's (750) connection to the first rigging line (730), which is connected to the at least one rigging support ring (720). As previously mentioned, a portion of the rescue rope (750) between the rescue rope proximal end (751) and the rescue rope distal end (752) is wound around the friction brake (713), as seen in FIG. 11. The friction brake (713) generally has a circular cross-section and may be formed with a solid or tubular construction. By wrapping a portion of the rescue rope (750) around the friction brake (713) several revolutions, a great mechanical advantage is created. Utilizing this mechanical advantage, a single user is able to control the load and lower the suspended access chair (10) from the elevated position to the ground without having to apply a large force on the rescue rope (750). In the embodiment of FIGS. 12 and 13 the friction brake (713) has a longitudinal axis that is parallel to the direction of the tensile load. In an even further embodiment, the longitudinal axis is substantially parallel to the plane in which the release device (715) travels from the locked position to the unlocked position.

Numerous alterations, modifications, and variations of the preferred embodiments disclosed herein will be apparent to those skilled in the art and they are all anticipated and contemplated to be within the spirit and scope of the suspended access chair (10) and rescue system (700), as claimed below. Further, the suspended access chair (10) may function with or without the rescue system (700), and the rescue system (700) has applicability in any suspended worker situation regardless of whether it includes a suspended access chair (10) as described herein. For example, although specific embodiments have been described in detail, those with skill in the art will understand that the preceding embodiments and variations can be modified to incorporate various types of substitute and or additional or alternative manufacturing processes and materials, relative arrangement of elements, and dimensional configurations. Accordingly, even though only few variations of the suspended access chair (10) and rescue system (700) are described herein, it is to be understood that the practice of such additional modifications and variations and the equivalents thereof, are within the spirit and scope of the suspended access chair (10) and rescue system (700) as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A suspended access chair (10) for accessing a wind turbine blade (15) mounted on a tower, comprising:
   a) a chair frame assembly (100);
   b) an operator seat (110) secured to the chair frame assembly (100);
   c) an upper frame assembly roller (120) secured to the chair frame assembly (100) at a level above the operator seat (110) and a lower frame assembly roller (130) secured to the chair frame assembly (100) at a level below the operator seat (110), the upper frame assembly roller (120) vertically spaced from the lower frame assembly roller (130) by an upper to lower roller vertical separation distance (131), and the upper frame assembly roller (120) horizontally spaced from the lower frame assembly roller (130) by an upper to lower roller offset distance (132), wherein the upper frame assembly roller (120) and the lower frame assembly roller (130) are configured for rolling contact along an edge of the wind turbine blade (15);

d) a primary dextral gripping arm (200) having a primary dextral gripping arm proximal end (201), a primary dextral gripping arm distal end (202), and at least one dextral gripping arm roller (211) configured for rolling contact along a portion of the wind turbine blade (15), wherein the primary dextral gripping arm (200) is pivotally connected to the chair frame assembly (100);

e) a primary dextral gripping arm adjustor (205) for adjusting a position of the primary dextral gripping arm (200), wherein the primary dextral gripping arm adjustor (205) is secured to the chair frame assembly (100) and the primary dextral gripping arm (200);

f) a primary sinistral gripping arm (300) having a primary sinistral gripping arm proximal end (301), a primary sinistral gripping arm distal end (302), and at least one sinistral gripping arm roller (311) configured for rolling contact along a portion of the wind turbine blade (15), wherein the primary sinistral gripping arm (300) is pivotally connected to the chair frame assembly (100);

g) a primary sinistral gripping arm adjustor (305) for adjusting a position of the primary sinistral gripping arm (300), wherein the primary sinistral gripping arm adjustor (305) is secured to the chair frame assembly (100) and the primary sinistral gripping arm (300); and h) a hoist (600) mounted on the chair frame assembly (100), wherein the hoist (600) is capable of raising and lowering the suspended access chair (10) along a suspension rope (20) to gain access to the wind turbine blade (15).

2. The suspended access chair (10) of claim 1, further including:
a) a dextral foot tray (400) pivotally connected to the chair frame assembly (100), the dextral foot tray (400) including a dextral foot tray roller (410); and
b) a sinistral foot tray (500) pivotally connected to the chair frame assembly (100), the sinistral foot tray (500) including a sinistral foot tray roller (510), wherein the dextral foot tray (400) and sinistral foot tray (500) are capable of adjustment such that the dextral foot tray roller (410) and the sinistral foot tray roller (510) are in rolling contact with the wind turbine blade (15).

3. The suspended access chair (10) of claim 1, further including:
a) a dextral blade tip stabilizer (150) secured to the chair frame assembly (100); and
b) a sinistral blade tip stabilizer (160) secured to the chair frame assembly (100), wherein the dextral blade tip stabilizer (150) and the sinistral blade tip stabilizer (160) are configured to stabilize a portion of the suspended access chair (10) with respect to the wind turbine blade (15).

4. The suspended access chair (10) of claim 1, further including:
a) a secondary dextral gripping arm (210) pivotally connected to the primary dextral gripping arm (200), wherein the at least one dextral gripping arm roller (211) is carried by the secondary dextral gripping arm (210); and
b) a secondary sinistral gripping arm (310) pivotally connected to the primary sinistral gripping arm (300), wherein the at least one sinistral gripping arm roller (311) is carried by the secondary sinistral gripping arm (310).

5. The suspended access chair (10) of claim 1, wherein the at least one dextral gripping arm roller (211) is located at a level below the operator seat (110) and the at least one sinistral gripping arm roller (311) is located at a level below the operator seat (110).

6. The suspended access chair (10) of claim 2, wherein the dextral foot tray roller (410) is located at a level below the at least one dextral gripping arm roller (211) and the sinistral foot tray roller (510) is located at a level below the at least one sinistral gripping arm roller (311).

7. The suspended access chair (10) of claim 1, wherein the hoist (600) is mounted on the chair frame assembly (100) at a level below the operator seat (110).

8. The suspended access chair (10) of claim 1, further including a pulley system (140) for guiding the suspension rope (20), wherein the pulley system (140) is offset so that the suspension rope (20) is positioned directly above the operator seat (110).

9. The suspended access chair (10) of claim 1, further including a lower roller to gripping arm roller distance (220) defined by the horizontal distance from a leading edge of the lower frame assembly roller (130) to the most distal end of the at least one dextral gripping arm roller (211) and the at least one sinistral gripping arm roller (311), wherein the lower roller to gripping arm roller distance (220) is greater than or equal to the upper to lower roller vertical separation distance (131).

10. The suspended access chair (10) of claim 4, further including a lower roller to gripping arm pivot distance (320) defined by the horizontal distance from a leading edge of the lower frame assembly roller (130) to the pivotal connection between the secondary dextral gripping arm (210) and the primary dextral gripping arm (200) and to the pivotal connection between the secondary sinistral gripping arm (310) and the primary sinistral gripping arm (300), wherein the lower roller to gripping arm pivot distance (320) is less than or equal to the upper to lower roller vertical separation distance (131).

11. The suspended access chair (10) of claim 1, further including a lower roller to gripping arm roller distance (220) defined by the horizontal distance from a leading edge of the lower frame assembly roller (130) to the most distal end of the at least one dextral gripping arm roller (211) and the at least one sinistral gripping arm roller (311), wherein the upper to lower roller offset distance (132) is at least 10 percent of the lower roller to gripping arm roller distance (220).

12. The suspended access chair (10) of claim 11, wherein the upper to lower roller offset distance (132) is less than or equal to 50 percent of the lower roller to gripping arm roller distance (220).

13. The suspended access chair (10) of claim 1, wherein the upper to lower roller offset distance (132) is at least 10 percent of the upper to lower roller vertical separation distance (131).

14. The suspended access chair (10) of claim 13, wherein the upper to lower roller offset distance (132) is less than or equal to 50 percent of the upper to lower roller vertical separation distance (131).

15. A system for providing access to a wind turbine blade (15) mounted on a tower, comprising:
a) a suspended access chair (10) having a chair frame assembly (100), wherein the suspended access chair (10) includes:
i) an operator seat (110) secured to the chair frame assembly (100);
ii) an upper frame assembly roller (120) secured to the chair frame assembly (100) at a level above the operator seat (110) and a lower frame assembly roller (130) secured to the chair frame assembly (100) at a level below the operator seat (110), the upper frame assembly roller (120) vertically spaced from the lower frame assembly roller (130) by an upper to lower roller vertical separation distance (131), and the upper frame assembly roller (120) horizontally spaced from the lower frame assembly roller (130) by an upper to lower roller offset distance (132), wherein the upper frame assembly roller (120) and the lower frame assembly roller (130) are configured for rolling contact along an edge of the wind turbine blade (15)

iii) a primary dextral gripping arm (200) having a primary dextral gripping arm proximal end (201), a primary dextral gripping arm distal end (202), and at least one dextral gripping arm roller (211) configured for rolling contact along a portion of the wind turbine blade (15), wherein the primary dextral gripping arm (200) is pivotally connected to the chair frame assembly (100);

iv) a primary dextral gripping arm adjustor (205) for adjusting a position of the primary dextral gripping arm (200), wherein the primary dextral gripping arm adjustor (205) is secured to the chair frame assembly (100) and the primary dextral gripping arm (200);

v) a primary sinistral gripping arm (300) having a primary sinistral gripping arm proximal end (301), a primary sinistral gripping arm distal end (302), and at least one sinistral gripping arm roller (311) configured for rolling contact along a portion of the wind turbine blade (15), wherein the primary sinistral gripping arm (300) is pivotally connected to the chair frame assembly (100);

vi) a primary sinistral gripping arm adjustor (305) for adjusting a position of the primary sinistral gripping arm (300), wherein the primary sinistral gripping arm adjustor (305) is secured to the chair frame assembly (100) and the primary sinistral gripping arm (300);

vii) a suspension rope (20); and viii) a hoist (600) mounted on the chair frame assembly (100), wherein the hoist (600) is capable of raising and lowering the suspended access chair (10) along the suspension rope (20) to gain access to the wind turbine blade (15); and b) a rescue system (700) for lowering the suspended access chair (10) from an elevated position to the ground, wherein the rescue system (700) includes:

i) a rescue support frame (710) having a friction brake (713) and a release device (715) capable of moving from a locked position to a released position, wherein the rescue support frame (710) is releasably securable to the tower;

ii) at least one rigging support ring (720), wherein the suspension rope (20) is secured to the at least one rigging support ring (720);

iii) a first rigging line (730) having a first rigging line proximal end (731) and a first rigging line distal end (732), wherein the first rigging line proximal end (731) is secured to the at least one rigging support ring (720) and the first rigging line distal end (732) is secured to the release device (715) when the release device (715) is in the locked position;

iv) a second rigging line (740) having a second rigging line proximal end (741) and a second rigging line distal end (742), wherein the second rigging line proximal end (741) is securable to the at least one rigging support ring (720) and the second rigging line distal end (742) is secured to the tower;

v) a rescue rope (750) having a rescue rope proximal end (751) and a rescue rope distal end (752), wherein the rescue rope proximal end (751) is secured to the at least one rigging support ring (720) and a portion of the rescue rope (750) between the rescue rope proximal end (751) and the rescue rope distal end (752) is wound around the friction brake (713); and vi) wherein when the second rigging line (740) is caused to disengage the tower, and the release device (715) is caused to pivot to the released position to release the first rigging line distal end (732) such that the rescue rope (750) supports the suspended access chair (10) and is capable of lowering the suspended access chair (10) from the elevated position to the ground.

16. The system of claim 15, wherein the suspended access chair (10) further includes:

a) a dextral foot tray (400) pivotally connected to the chair frame assembly (100), the dextral foot tray (400) including a dextral foot tray roller (410); and b) a sinistral foot tray (500) pivotally connected to the chair frame assembly (100), the sinistral foot tray (500) including a sinistral foot tray roller (510), wherein the dextral foot tray (400) and sinistral foot tray (500) are capable of adjustment such that the dextral foot tray roller (410) and the sinistral foot tray roller (510) are in rolling contact with the wind turbine blade (15).

17. The system of claim 15, wherein the suspended access chair (10) further includes:

a) a dextral blade tip stabilizer (150) secured to the chair frame assembly (100); and b) a sinistral blade tip stabilizer (160) secured to the chair frame assembly (100), wherein the dextral blade tip stabilizer (150) and the sinistral blade tip stabilizer (160) are configured to stabilize a portion of the suspended access chair (10) with respect to the wind turbine blade (15).

18. The system of claim 15, wherein the suspended access chair (10) further includes:

a) a secondary dextral gripping arm (210) pivotally connected to the primary dextral gripping arm (200), wherein the at least one dextral gripping arm roller (211) is carried by the secondary dextral gripping arm (210); and b) a secondary sinistral gripping arm (310) pivotally connected to the primary sinistral gripping arm (300), wherein the at least one sinistral gripping arm roller (311) is carried by the secondary sinistral gripping arm (310).

19. The system of claim 15, wherein the suspended access chair (10) further includes a rope lock device (180) secured to the chair frame assembly (100), wherein the rope lock device (180) receives a secondary rope (30) that is secured to the at least one rigging support ring (720) and the rope lock device (180) is capable of preventing unintentional descent of the suspended access chair (10).

* * * * *